United States Patent Office 2,870,195
Patented Jan. 20, 1959

2,870,195

ALKYL BETA-ALKOXYPROPIONATES

Samuel Allen Heininger and Milton Kosmin, Dayton, Ohio, assignors to Monsanto Chemical Company, a corporation of Delaware No Drawing. Application April 20, 1955
Serial No. 502,753

6 Claims. (Cl. 260—484)

The present invention relates to ether-esters and more particularly provides certain hitherto unknown esters of alkoxyproprionates, methods of preparing said esters and functional fluids comprising the new esters.

According to the invention there are provided new and valuable alkyl β-alkoxyproprionates having the following formula $$ROCH_2CH_2COOR'$$

in which R and R' are branched chain alkyl radicals of from 8 to 18 carbon atoms. The new propionates are readily obtainable by the addition reaction of an appropriate fatty alcohol with an appropriate alkyl acrylate, substantially according to the scheme:

$$ROH + CH_2:CHCOOR' \rightarrow ROCH_2CH_2COOR'$$

wherein R and R' are as defined above.

Alcohols useful for the preparation of the present esters are branched chain fatty alcohols of from 8 to 18 carbon atoms. Such alcohols are readily available commercial products which are prepared by a variety of procedures in known manner. Of particular utility for the present purpose are the branched chain alcohols obtained according to the "Oxo" process by the high pressure reaction of olefin polymers such as diisobutylene or tetrapropylene with carbon monoxide and hydrogen. Of present utility also are the branched chain alcohols prepared by the Guerbet process, i. e., by the high pressure reaction of an alcohol with an alkali metal alcoholate. Likewise, presently useful are the branched chain alcohols obtained by the hydrogenation of aldehyde condensates. Technical mixture of alcohols obtained by such processes, distillation fractions of narrow boiling range obtained from said technical mixtures of alcohols, or individual branched chain alcohols are of general utility in preparing the present esters. Examples of specific alcohols which are useful in preparing the present branched chain alkyl β-alkoxypropionates are:

3,5,5-trimethylhexanol-1
3,9-diethyltridecanol-6
7-ethyl-2-methylundecanol-4
2-butyloctanol-1
5-ethylnonanol-2
14-methylpentadecanol-1
2-propylheptanol-1
2,6,8-trimethylnonanol-4
2,2,4-trimethylpentanol-3
3,7-dimethyloctanol-1
3-ethyl-7-methyloctanol-1
2-methyldodecanol-1
14-methylhexadecanol-1

The present higher branched chain alkyl β-alkoxypropionates are generally viscous materials which possess a high degree of utility as functional fluids in that they remain stable and fluid over a wide range of temperature conditions. In this they differ remarkably from prior straight chain alkyl β-alkoxypropionates, such prior esters being either solids at ordinary temperatures or fluids which do not demonstrate a stability of properties under conditions of varying temperature changes. Thus, for example, I have found that, while n-decyl β-n-decyloxypropionate and the branched chain decyl β-decyloxypropionate obtained from an "Oxo" fraction of branched chain alcohols are both fluid at ordinary temperatures, the former solidifies at minus 40° F., whereas the latter remains a fluid at this low temperature. n-Dodecyl β-n-dodecyloxypropionate is a crystalline solid at ordinary room temperature, whereas the present series of branched chain alkyl β-alkoxy-propionates are fluids. Again, while the straight chain n-octyl β-n-octyloxypropionate forms crystals at about 15° F., the branched chain octyl β-octyloxypropionate is a fluid at this temperature and remains fluid when exposed to lower temperatures.

Preparation of the branched chain alkyl β-alkoxypropionates according to the invention is advantageously effected by simply mixing the ester of acrylic acid and a branched chain alcohol with the same or a different alcohol in the presence or absence of an alkaline catalyst and allowing the reaction mixture to stand at moderately increased temperatures, say, at a temperature of from 50° C. to the refluxing temperature, until addition of the alcohol to the acrylate has been completed. Alkaline catalysts which may be used in effecting the addition reaction are inorganic or organic compounds generally, for example, alkali metal hydroxides or the basic salts thereof such as sodium or potassium hydroxide or magnesium or lithium carbonate; alkali metal alcoholates such as sodium or potassium methoxide, quaternary ammonium bases, etc. Advantageously, the catalyst may be prepared in situ, for example, by adding metallic sodium or potassium to the alcohol employed in the addition reaction in order to form a small but catalytic quantity of alkali metal alcoholate. The addition reaction may be conducted in the presence or absence of an extraneous diluent or solvent, for example, an organic liquid which is inert under the reaction conditions employed, e. g., benzene, hexane or dioxane. However, since the reaction occurs smoothly and at readily obtainable temperatures, the use of such solvents or diluents is generally unnecessary. Inasmuch as preparation of the present alkyl alkoxypropionates involves addition of one mole of the fatty alcohol to one mole of the alkyl acrylate, the alcohol and acrylate are advantageously employed in stoichiometric proportions. However, an excess of either reactant may be used, since any unreacted material is readily recovered from the final reaction product.

The present alkoxypropionates are also obtainable by reaction of acrylonitrile with the branched chain fatty alcohol in an acidic aqueous medium. While the course of the reaction in this instance is not known precisely, there may be assumed a primary hydrolysis of the acrylonitrile to acrylic acid, esterification of the acid with one mole of the alcohol to give the branched chain alkyl acrylate and addition of another mole of the fatty alcohol to the acrylate to form the branched chain alkyl β-alkoxypropionate. However, the reaction may be also assumed to occur by primary formation of an imino salt from the nitrile and acid component of the aqueous acidic medium, and reaction of said salt with a mole of the alcohol to yield and the alkyl acrylate which then adds to another mole of the alcohol as shown above. In effecting preparation of the present alkyl β-alkoxypropionates from acrylonitrile and the alcohol, it may be advantageous to first add the nitrile to the aqueous acid and to allow the resulting reaction mixture to stand at ordinary or moderately increased temperatures until evidence of reaction, as noted by exothermal heating, has subsided. The alcohol is then added, and the resulting mixture is maintained at, say, a temperature of from about 60° C. to the refluxing temperature of the mixture, until formation of the alkyl alkoxypropionate has taken place.

The present branched chain, higher alkyl alkoxypropionates are stable, well-defined viscous liquids which may be used for a variety of industrial purposes, e. g., as plasticizers for synthetic resins or as lubricants and lubricant additives, but they are more advantageously employed as functional fluids. Functional fluids comprising the present propionates have general utility as force-transmission fluids for the transmission of pressure, power or torque in fluid pressure or torque-activated mechanisms; as synthetic lubricants between relatively moving parts; as liquid materials in the filters of air conditioning systems, etc. The present branched chain alkyl β-alkoxypropionates are highly valuable for these and related uses because of their good heat stability, their ability to remain liquid at low temperatures, their good pumpability under varying pressures encountered over wide temperature ranges, their desirable lubricating properties and high viscosity index, etc. The functional fluids may consist entirely of the present esters or they may be mixtures of said esters with other fluids known in the art to be useful as constituents of industrially available hydraulic fluids, torque converter fluids, heat transmission fluids, etc. As examples of such extraneous constituents may be mentioned, for example, tribasic organic phosphate esters such as tricresyl phosphate, the partially chlorinated biphenyls known to the trade as "Aroclors," technical mixtures of biphenyl and terphenyl and other fluids having the property of remaining liquid under a wide range of temperature conditions and contributing to the utility for which said fluid is designed. Functional fluids comprising the present branched chain alkyl alkoxypropionates may also contain small amounts of agents adapted to modify the various properties thereof and generally known to the trade as "additives." Such additives may be minor but effective amounts of materials such as corrosion-inhibitors, antirusting agents, extreme pressure resisting additives, etc.

The present invention is further illustrated, but not limited, by the following examples:

*Example 1*

Concentrated sulfuric acid (300 g., 3.0 moles) was diluted with 54 g. (3.0 moles) of water, and there was then added to the diluted acid, at a temperature of 85–100° C., and during a period of one hour, a mixture of 159 g. (3.0 moles) of acrylonitrile and 3.0 g. (2%) of hydroquinone. The resulting mixture was heated at 85–90° C. for an additional hour, and there was then added to the heated mixture 540 g. of a branched chain nonanol obtained by the "Oxo" reaction from carbon monoxide, hydrogen and butylene dimer. After stirring the whole for 6 hours at 100° C., it was allowed to cool slowly and stand overnight at room temperature. It was then treated with 400 g. of water and allowed to stratify. The resulting organic layer was separated, and dried by filtering through anhydrous sodium sulfate. Vacuum distillation of the dried product to remove material boiling below 140° C./1–2 mm. gave as residue the crude branched chain nonyl β-nonyloxypropionate, which was treated twice with a charcoal decolorizer and then redistilled to give the substantially pure colorless nonyl β-nonyloxypropionate, B. P. 138–140° C./0.3 mm., $n_D^{25}$ 1.4398, and analyzing as follows:

|  | Found | Calculated for $C_{21}H_{42}O_3$ |
| --- | --- | --- |
| Percent C | 73.71 | 73.7 |
| Percent H | 12.67 | 12.35 |

The present branched chain nonyl β-nonyloxypropionate was found to have the following characteristics:

Viscosity, cs.:
  210° F _____ 2.38
  100° F _____ 7.80
  Minus 40° F _____ 820
Viscosity index _____ 179
Pour point, °F _____ Minus 80
Flash point, °F _____ 340
Fire Point, °F _____ 385

*Example 2*

Approximately 0.5 g. of metallic sodium was added to 77.2 g. of a branched chain tridecyl alcohol obtained according to the "Oxo" process by the high pressure reaction of carbon monoxide and hydrogen with propylene tertramer or butylene trimer. The mixture was heated to 50° C., with stirring, and there was then rapidly added 98 g. (0.386 mole) of tridecyl acrylate containing 1 g. of hydroquinone. The tridecyl portion of the ester was derived from the tridecyl alcohol characterized above. After adding the acrylate to the mixture of sodium and tridecyl alcohol, it was heated, with stirring, at 80–90° C. for 2 hours, allowed to stand overnight at room temperature, and then heated at 80–90° C. for an additional 6 hours. The resulting reaction mixture was then neutralized with hydrochloric acid and vacuum distilled to give 121 g. (69.2% theoretical yield) of the substantially pure branched chain tridecyl β-tridecyloxypropionate, B. P. 190–216° C./0.5 mm. (predominately at 213–216° C./0.5 mm.), $n_D^{25}$ 1.4526, having a saponification equivalent of 453.6 as against 454.8, the calculated saponification equivalent of a tridecyl tridecyloxypropionate.

The present branched chain tridecyl β-tridecyloxypropionate was found to have the following characteristics:

Viscosity, cs.:
  210° F _____ 4.04
  100° F _____ 19.41
  Minus 40° F _____ 11,700
Viscosity index _____ 123
Flash point, ° F _____ 430
Fire point, ° F _____ 500
Pour point, ° F _____ Minus 70

The closely related n-dodecyl β-n-dodecyloxypropionate is a crystalline compound at ordinary room temperature.

*Example 3*

This example describes the preparation of a branched chain decyl β-decyloxypropionate wherein the decyl radical is derived from a branched chain decyl alcohol obtained by the high pressure reaction of propylene trimer with carbon monoxide and hydrogen.

To 158 g. (0.75 mole) of the branched chain 3-decyloxypropionitrile which had been heated to a temperature of 70° C., there was added dropwise, with stirring, a diluted sulfuric acid consisting of 50 g. of 95.5% $H_2SO_4$ in 9 g. of water. During the addition, the temperature of the reaction mixture was maintained at from 70° to 90° C. After introduction of the sulfuric acid had been completed, the whole was heated for 45 minutes at 85–100° C. and there was then added 86 g. (0.6 mole) of said branched chain decyl alcohol and 100 ml. of toluene. Heating of the resulting reaction mixture at reflux temperature (pot temperature, 148° C.) for three hours while removing reaction water (3 g.) by means of a Dean-Stark trap, pouring the reaction mixture into water, and fractionation of the resulting organic layer gave 140 g. of the substantially pure branched chain decyl β-decyloxypropionate, B. P. 182–5° C./0.7 mm., $n_D^{25}$ 1.4449.

The present branched chain decyl β-decyloxypropionate was found to have the following characteristics:

Viscosity, cs.:
    210° F_____ 2.43
    100° F_____ 8.58
    Minus 40° F_____ 1400
    Minus 65° F_____ 9300
Viscosity index_____ 116

Example 4

For purposes of comparison, there was prepared the n-decyl β-n-decyloxypropionate instead of the branched chain decyl β-decyloxypropionate of Example 3.

Ninety grams of water was mixed with 500 g. of concentrated sulfuric acid, and to the resulting mixture there was added 265 g. (5.0 mole) of acrylonitrile and 5 g. of hydroquinone at a rate which permitted maintenance of the temperature of the reaction mixture at from 85° C. to 95° C. When all of the acrylonitrile had been added (1.25 hours) the whole was stirred for 1 hour at 85–90° C., 990 g. of n-decanol was introduced, and the temperature was increased to 100–110° C. and maintained within this range for 5 hours. At the end of that time, the reaction mixture was allowed to stand overnight. The solid which had formed in the mixture upon standing was dissolved in water, and the organic layer thus obtained was separated. After repeated water washings, the organic layer was incorporated with about 1 g. of methylene blue and submitted to vacuum distillation. There was thus obtained the substantially pure n-decyl β-n-decyloxypropionate, B. P. 200–206° C./0.7 mm., $n_D^{25}$ 1.4432.

The n-decyl β-n-decyloxypropionate had the following characteristics:

Viscosity, cs.:
    210° F_____ 2.58
    100° F_____ 8.44
    Minus 40° F_____ solid
Viscosity index_____ 153

Example 5

This example describes the preparation of a 2-ethylhexyl β-tridecyloxypropionate where the tridecyl radical is derived from a branched chain tridecanol obtained by the high pressure reaction of triisobutylene with carbon monoxide and hydrogen. A mixture of 184 g. (1.0 mole) of 2-ethylhexyl acrylate (stabilized with 0.1% of hydroquinone) and 200 g. (1.0 mole) of said tridecyl alcohol was treated with 3 ml. of a 50% dispersion of sodium in toluene. Within 5 minutes, an exothermic rise to 60° C. was noted. The whole was then heated with stirring at 100° C. for four hours, neutralized with hydrochloric acid and finally distilled to give 236 g. of the 2-ethylhexyl tridecyloxypropionate, $n_D^{25}$ 1.4469, a water-white mobile liquid.

The present propionate had the following characteristics:

Viscosity, cs.:
    210° F_____ 2.48
    100° F_____ 9.18
    Minus 40° F_____ 1800
    Minus 65° F_____ 13,300
Viscosity index_____ 104

Example 6

This example describes the preparation of a branched chain decyl β-nonyloxypropionate by the reaction of a β-nonyloxypropionitrile wherein the nonyl radical was derived from a branched chain nonyl alcohol obtained according to the "Oxo" reaction and diisobutylene, carbon monoxide and hydrogen, and a branched chain decanol obtained according to the "Oxo" process and propylene trimer, carbon monoxide and hydrogen.

Into a mixture consisting of 197.3 g. (1.0 mole) of the β-nonyloxypropionitrile and 150.3 g. (1.0 mole) of said decanol, there was passed gaseous hydrogen chloride, with stirring and cooling. The temperature of the reaction mixture was maintained at from 25–35° C. by controlling the rate of hydrogen chloride addition. At the end of 20 minutes, introduction of the hydrogen chloride was discontinued, and after stirring the reaction mixture at room temperature for 30 minutes, the whole was allowed to stand overnight. It was then poured into water, ether was added, the layers were separated, and the organic layer was distilled to give 235 g. of the substantially pure branched chain decyl β-nonyloxypropionate, 155–160° C./0.2 mm., $n_D^{25}$ 1.4428, a water-white mobile liquid.

The present propionate was found to have the following characteristics:

Viscosity, cs.:
    210° F_____ 2.48
    100° F_____ 8.30
    Minus 40° F_____ 1190
    Minus 65° F_____ 10,500
Viscosity index_____ 128

Example 7

This example describes the preparation of an octyl β-octyloxypropionate by the reaction of acrylonitrile with a branched chain octyl alcohol obtained according to the "Oxo" reaction from a 7-carbon olefinic hydrocarbon, carbon monoxide, and hydrogen.

To a mixture consisting of 460.8 g. (3.55 mole) of said branched chain octyl alcohol and 10 ml. of 40% aqueous trimethylbenzylammonium hydroxide, there was gradually added, with stirring, 106 g. (2.0 mole) of acrylonitrile during a period of 1 hour. The temperature of the reaction mixture during the acrylonitrile addition was maintained at 50–60° C. by controlling the rate at which the nitrile was introduced. The reaction mixture was then cooled to 20° C. and gaseous hydrogen chloride was introduced into it during 1 hour, while maintaining the temperature of the reaction mixture at 15–25° C. by means of an icebath. The whole was then stirred in the icebath for another 45 minutes and allowed to stand. Addition of water to the reaction mixture and distillation of the resulting organic layer gave 407 g. of the substantially pure branched chain octyl β-octyloxypropionate, B. P. 120–155° C. (mainly, 138–155° C.) at 0.5 mm., $n_D^{25}$ 1.4393, and analyzing as follows:

| | Found | Calculated for $C_{19}H_{38}O_3$ |
|---|---|---|
| Percent C | 71.85 | 72.6 |
| Percent H | 11.91 | 12.2 |

The present branched chain octyl β-octyloxypropionate was found to have the following characteristics:

Viscosity, cs.:
    210° F_____ 1.93
    100° F_____ 6.27
    Minus 40° F_____ Channels
Flash point, °F_____ 330
Fire point, °F_____ 375
Pour point, °F_____ Minus 20

Example 8

Employing substantially the procedure described above, but using n-octyl alcohol instead of the branched chain octyl alcohol, there was prepared n-octyl β-n-octyloxypropionate, B. P. 150–174° C. at 0.8 mm., $n_D^{25}$ 1.4375. This unbranched ester was found to have the following characteristics:

Viscosity, cs:
    210° F_____ 1.87.
    100° F_____ 5.47.
    Minus 40° F_____ Crystalline.
Flash point, °F_____ 375.
Fire point, °F_____ 405.
Pour point, °F_____ Plus 15 (crystals rapidly).

In preparing the alkyl β-alkoxypropionates either from the fatty alcohol and the alkyl acrylate or the fatty alcohol and acrylonitrile, an inhibitor of polymerization, e. g., hydroquinone, pyrogallol or diphenylamine is often advantageously employed, and particularly so in the reaction with acrylonitrile, especially when operating at temperatures of, say, from 90° C. to 100° C. In the alkyl acrylate-alcohol addition reaction, however, the use of an inhibitor may be dispensed with, even at such higher temperatures, these higher alkyl acrylates being much less susceptible to polymerization than is acrylonitrile. Moreover, the acrylate-alcohol reaction being one of direct addition generally does not require the more drastic manipulations necessitated in the acrylonitrile reaction and hence avoidance of polymerization is not so much of a factor as it is in the nitrile reaction.

In isolating the alkyl β-alkoxypropionates, particularly those in which the branched chain alkyl and alkoxy radicals each have 10 or more carbon atoms, there may be experienced considerable foaming difficulties in the distillation step. This may be avoided by thorough water-washing of the reaction mixture prior to distillation.

Variations and modifications which will be obvious to those skilled in the art can be made in the foregoing processes and compositions without departing from the scope or spirit of the invention.

This application is a continuation-in-part of my application Serial Number 406,059, filed on January 25, 1954, and now abandoned.

What is claimed is:

1. An alkyl β-alkoxypropionate wherein each alkyl radical and each alkoxy radical is a branched chain of from 8 to 18 carbon atoms.
2. Octyl β-octyloxypropionate in which said octyl and octyloxy radicals are branched chain structures.
3. Nonyl β-nonyloxypropionate in which said nonyl and nonyloxy radicals are branched chain structures.
4. Decyl β-decyloxypropionate in which said decyl and decyloxy radicals are branched chain structures.
5. Tridecyl β-tridecyloxypropionate in which said tridecyl and tridecyloxy radicals are branched chain structures.
6. Decyl β-nonyloxypropionate in which said decyl and nonyloxy radicals are branched chain structures.

References Cited in the file of this patent
UNITED STATES PATENTS 2,710,877   Young et al. _____ June 14, 1955

OTHER REFERENCES

Rehberg et al.: J. Am. Chem. Soc. (1946), 68, 544–6.
Rehberg et al.: J. Am. Chem. Soc. (1947), 69, 2966–70.
Bried et al.: Ind. Eng. Chem. 39 (1947), pp. 484–91.